UNITED STATES PATENT OFFICE.

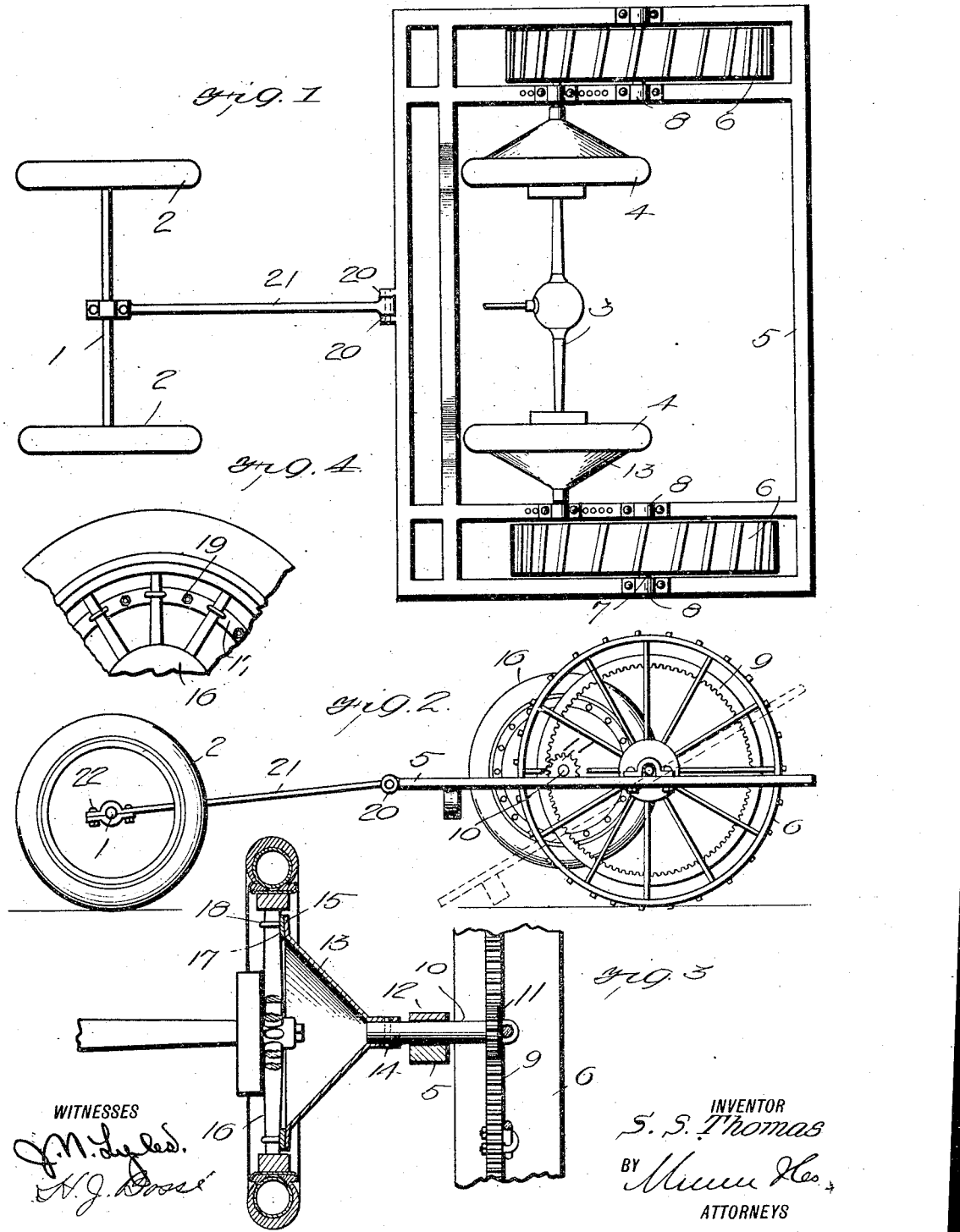

SAMUEL SHELBY THOMAS, OF PAMPA, TEXAS.

TRACTOR ATTACHMENT.

1,287,792.

Specification of Letters Patent.  Patented Dec. 17, 1918.

Application filed August 22, 1917. Serial No. 187,616.

*To all whom it may concern:*

Be it known that I, SAMUEL S. THOMAS, a citizen of the United States, and a resident of Pampa, in the county of Gray and State of Texas, have invented new and useful Improvements in Tractor Attachments, of which the following is a specification.

My invention is an improvement in tractor attachments, and has for its object to provide a device of the character specified adapted for attachment to the rear wheels of motor vehicles for supporting said wheels out of contact with the ground, and having means for connecting the wheels to power wheels in connection with the attachment for driving the vehicle at a greatly increased power.

In the drawings:

Figure 1 is a top plan view of the attachment;

Fig. 2 is a side view;

Fig. 3 is a sectional view of the connection between the tractor and the rear wheels of the vehicle;

Fig. 4 is a partial side view of one of the vehicle wheels showing the connecting ring.

The present embodiment of the invention is shown in connection with a motor vehicle having a front axle 1 supporting the front wheels 2, and a rear axle 3 supporting the rear wheels 4.

The attachment comprises a suitable frame 5, at each end of which is journaled a power wheel 6, said wheels being journaled on stub shafts 7 which are journaled in bearings 8 in the frame. An internal gear ring 9 is secured to each power wheel at the inner face thereof, and a short shaft 10 is journaled on the frame adjacent to each gear ring, each shaft 10 having a disk 11 engaging the adjacent gear ring.

These shafts 10 are journaled in bearings 12 on the frame, and each shaft carries at its inner end a conical member 13, the small end of each of the said members having a sleeve 14 fitting the adjacent shaft 10 and secured thereto as shown, while the large end of each of the said members has an outwardly extending flange 15.

These flanges 15 have an external diameter just sufficient to be received within the felly of the automobile wheel 16, and a ring 17 is secured to the spokes of each wheel, each ring 17 having a diameter corresponding to that of the flange. The ring 17 is held to the spoke by means of U-shaped clips 18, and the flange 15 is held to the ring by means of bolts and nuts 19. The power wheels 6 are of such diameter that when the frame is level the vehicle wheels 16 will be held out of contact with the ground, and since they will be driven by the power plant of the vehicle it will be obvious that they will drive the shafts 10 through the pinions 11 and the gear rings 9 and power wheels will be driven at a lower speed but with greatly increased power.

The parts are so arranged that when the frame 5 is free to take the position indicated in dotted lines in Fig. 2 the flanges 15 of the cone shaped members will be at the level of the rings 17 when the motor vehicle is backed into place between the said cone shaped members. The frame has at its front a pair of lugs 20, between which is received one end of a reach bar 21, and the said reach bar is connected to the lugs, as shown. A sectional clamp 22 is connected with the front end of the reach bar, and this clamp is adapted to engage the front axle of the vehicle to hold the frame 5 horizontal.

In inoperative position the attachment takes the position shown in dotted lines in Fig. 2, and to connect the vehicle thereto it is only necessary to back the rear wheels into register with the cone shaped members 13. These members are now secured to the rings 17, and the frame is tilted, the reach bar being connected to the front axle. The device is now ready for operation.

I claim:

A tractor attachment for connection with the rear wheels of a motor vehicle, comprising a frame having power wheels journaled at the ends thereof, a conical member near each wheel and having at its small end a stub shaft journaled on the frame and having a driving connection with the adjacent tractor wheel, a ring having clips for connecting the same to the spokes of the wheel of the automobile, said conical member having a marginal flange at its large end for abutting the ring, the ring and the flange having registering openings, and bolts engaging the openings for connecting the ring and the conical member.

SAMUEL SHELBY THOMAS.

Copies of this patent may be obtained for five cents each, by addressing the "Commissioner of Patents, Washington, D. C."